Figure 1:
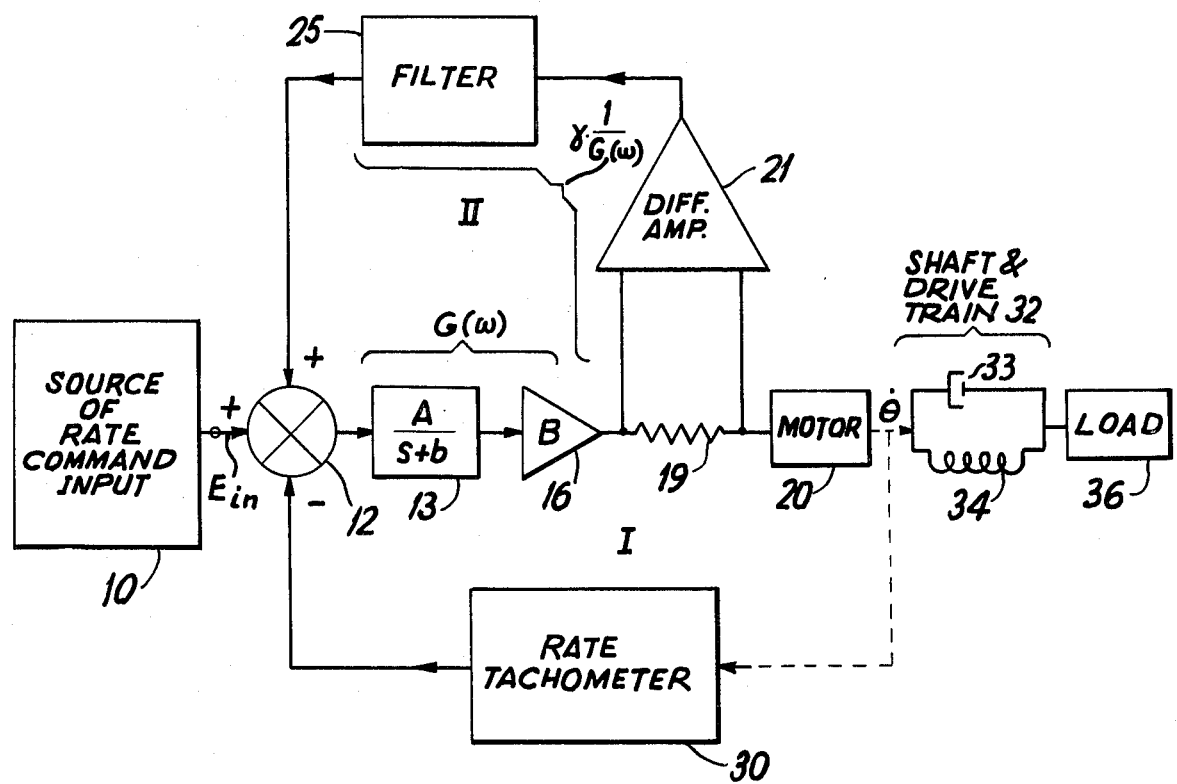

United States Patent [19]

Bigley, Jr. et al.

[11] 4,295,081
[45] Oct. 13, 1981

[54] LOAD ACTUATING SERVOMECHANISM WITH RESONANCE EQUALIZATION

[75] Inventors: William J. Bigley, Jr., Scotch Plains; Vincent J. Rizzo, Basking Ridge, both of N.J.

[73] Assignee: Lockheed Electronics Co., Inc., Plainfield, N.J.

[21] Appl. No.: 866,394

[22] Filed: Jan. 6, 1978

[51] Int. Cl.³ ............................................. H02P 5/00
[52] U.S. Cl. ................................... 318/327; 318/618; 318/448
[58] Field of Search ............... 318/326, 327, 328, 618, 318/331, 390, 448, 615–617, 799, 802, 332, 338, 619–621, 623, 624, 629

[56] References Cited

PUBLICATIONS

Reed, J. W., "Access-Control System with Reduced Velocity Error", *IBM Tech. Disc. Bull.*, vol. 19, No. 5, Oct-76, p. 1884.
Gottlieb, I. M., *Electronic Motors and Motor Control Technique*, Howard W. Sams & Co., 1976, pp. 117–119.

*Primary Examiner*—David Smith, Jr.
*Attorney, Agent, or Firm*—Stephen B. Judlowe

[57] ABSTRACT

Load actuating servomechanism apparatus includes dynamic regeneration to equalize and overcome a frequency-varying load/load drive train mechanical resonance. The drive circuitry comprises a per se conventional primary motor speed controlling rate feedback loop including a cascaded rate signal command source, summing error-signal producing node, and loop frequency response shaping filter and driver amplifier for exciting a load driving motor, and a rate tachometer signal feedback element connecting a measure of the motor output speed to a subtractive input of the summing node.

To broaden the response band of the primary feedback circuit and accommodate a mechanical resonance otherwise interfering therewith, a secondary, positive feedback path supplements the input rate command with a signal dependent upon motor current, and thus upon motor load. Accordingly, output load drive automatically increases as motor current increases when a load drive retarding mechanical resonance is encountered.

6 Claims, 2 Drawing Figures

LOAD ACTUATING SERVOMECHANISM WITH RESONANCE EQUALIZATION

This invention relates to electronically controlled load driving circuits and, more specifically, to a load actuating servomechanism including dynamic regeneration to equalize load resonance.

It is an object of the present invention to provide improved electronic circuitry for driving a mechanical load.

More specifically, an object of the present invention is the provision of load actuating servomechanism apparatus which includes an additional regenerative feedback path for counteracting a load/load coupling mechanical resonance.

The above and other objects of the present invention are realized in a specific, illustrative mechanical load driving rate servo arrangement for controlling a load-driving motor. A per se conventional primary rate loop includes a cascaded rate signal command source, summing errorsignal producing node, loop frequency response shaping filter and driver amplifier for exciting the motor, and a rate tachometer connecting a measure of the motor output speed to a subtractive input of the summing node.

To widen the response band of the primary servo system and accommodate mechanical resonances otherwise interferring therewith, a secondary, positive feedback path augments the input rate command with a signal dependent upon instantaneously consumed motor current. Thus, output load drive automatically increases as motor current increases when a load drive retarding mechanical resonance is encountered.

Figure 2:
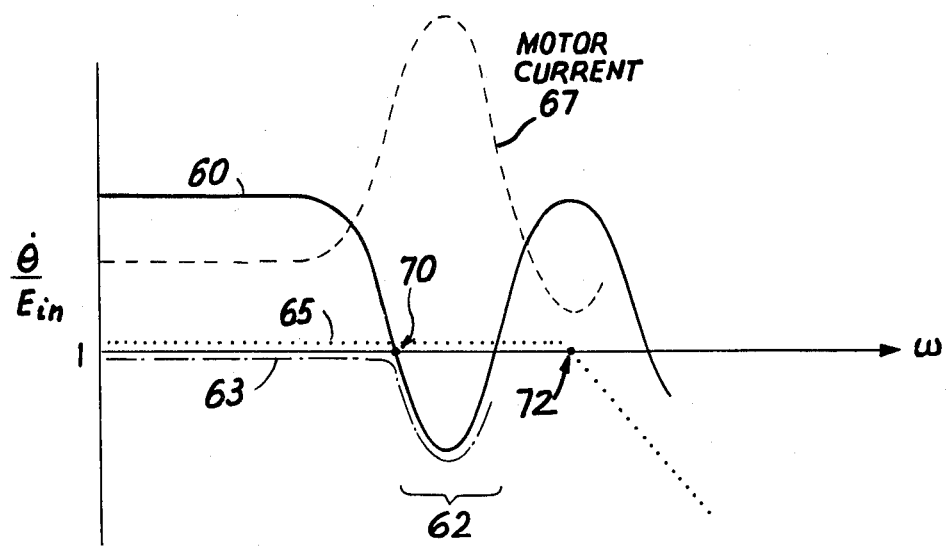

The above and other features and advantages of the present invention will become more clear from the following detailed description of a specific, illustrative embodiment thereof, presented in conjunction with the accompanying drawing, in which:

FIG. 1 is a schematic block diagram illustrating a load actuating composite servomechanism system in accordance with the principles of the present invention; and FIG. 2 depicts several wave forms characterizing the present invention.

Referring now to FIG. 1, there is shown a multi-loop rate servomechanism arrangement for controlling the speed of a driven load 36 in accordance with an input rate command supplied by a source 10 thereof. Load 36 actuation (e.g., rotation) is effected by a motor 20 having its output drive shaft connected to the load 36 via a shaft and/or drive train 32 of any form and construction. The arrangement comprises a primary motor 20 rate controlling feedback loop I which is per se conventional, and which employs an actuation path for the motor 20 from the input source 10 via a linear summing element (node) 12 (e.g., an operational amplifier) and a forward gain frequency response shaping filter—driver of composite frequency response $G(\omega)$. Most simply and without limitation, the forward gain shaping function 13 may simply comprise an active or passive low pass filter ("lag" network) of conventional transform $A/s+b$ followed by a driver amplifier 16 of gain B. For present purposes, any discussion of a motor current sensing monitor resistor 19 is omitted. In the feedback path of the primary loop I is a rate tachometer 30 having an input which senses the instantaneous rotational speed of the motor output shaft ($\dot{\theta}$), and which supplies an electrical signal proportional to such motor 20 shaft rate to the subtractive input of the summing node 12.

The primary rate controlling servo loop I above identified, again, is per se well known, and will thus only briefly be considered here. The rate command source 10 in the general case supplies a time varying output signal $E_{in}(t)$ specifying a desired rotational rate for the load. This signal $E_{in}(t)$ is compared with the instantaneous shaft rate ($\dot{\theta}$) signal by the rate tachometer 30 and any difference ("error" signal in feedback terminology) applied to the input of the forward gain elements 13, 16. The output of the forward gain elements, present at the output port of the driver amplifier 16, is then applied as a driving signal to the motor 20. At steady state, and assuming a sufficient frequency response capability for the motor 20, the primary loop I operates to automatically obviate or minimize the error at the output of summing node 12, thus constraining the output shaft rate of motor 20 to follow the proscribed value $E_{in}(t)$. Indeed, for frequencies well within the open loop system response band, the system does indeed work in the above described manner and effect such load driving control.

However, the output shaft of motor 20 is connected to the load 36 by a shaft/drive train coupling 32 representable by a spring factor 34 in parallel with a molecular friction element 33. The spring 34 represents shaft and drive train resilience, backlash and the like, while the schematic dash pot 33 symbolizes internal molecular friction. The representation 33-34 and the analysis of same is again, per se well known for mechanical motion treatment. The difficulty with prior art rate servos of the primary (sole loop I) type is the self resonance exhibited by the coupling 32. In particular, at a resonance frequency for the elements 33, 34 and 36, it becomes very difficult for the motor 20 to drive the load 36 since output motion and energy from the motor 20 is simply absorbed in the effective resonating elements rather than being passed through to the load 36. To graphically illustrate the foregoing, and with reference to FIG. 2, a curve 60 comprises an open loop response of the loop I system, and has a zone 62 exhibiting such resonance where motor output drive cannot efficiently follow the input signal command. The same is true for the normalized closed loop response 63 shown for the system. Also shown in FIG. 2 is a dashed curve 67 reflecting motor current which greatly increases in the area of resonance because of the apparent much larger load connected to the motor 20 under such circumstances.

The consequence of the foregoing are to limit such prior art, primary rate feedback loops to driving signal frequencies below the resonance frequency area, and in particular to frequencies ($\omega$) appreciably below the point 70 at which the open loop response crosses through unity gain. However, such limited response is not always satisfactory—e.g., in applications where the output load comprises a weapons turret or the like which must fire upon rapidly moving targets. It is also observed with respect to the foregoing that the resonance area 62 is not fixed in frequency value, since the effective drive shaft coupling 32 parameters change, as with input signal level. Thus, for example, the effective coupling spring factor (element 34) is dependent upon backlash which, in turn, depends upon the level of the applied input rate signal variations reflected in the signal $E_{in}(t)$.

Accordingly, in the prior art arrangements, the factor "b" comprising the falloff rate for the loop I shaping low pass filter 13 has been selected substantially below a median point 70, i.e., below the beginning portion of the resonance zone 62 to assure that proper feedback action occurs. Again, this loop response limitation is undesirable in some applications, and intolerable in others.

To obviate the foregoing, applicants employ a second positive or regenerative feedback path II. In particular, the instantaneous drive current consumed by the motor 20 is sensed, as by a current monitoring resistance 19 connected intermediate the motor driving amplifier 16 and the energy receiving port of the motor 20. The current signal across resistance 19 is buffered and converted to single ended form relative to ground for convenience in a difference amplifier 21, and passes through a path II feedback filter 25 to an additive input port of the summing node 12. The transfer function of the composite circuitry II feedback path is advantageously $\gamma 1/G(\omega)$, i.e., a factor $\gamma$ (a positive number between zero and unity) advantageously multiplied by the inverse of the forward gain filter function $G(\omega)$. This provides speedy response with stability. Thus, for a low pass, lag network 13, the filter 25 would simply comprise a high pass or lead network.

To consider now operation of the supplementary, regenerative feedback path II, when a resonance zone 62 (FIG. 2) is encountered by a rapidly changing input command $E_{in}(t)$, the increasing motor current 67 sensed across resistor 19 passes through difference amplifier 21 and filter 25, thereby furnishing an increased potential at the upper, additive input of summing node 12. This augments the rate command signal $E_{in}(t)$, thereby automatically applying an increased drive at resonance to the motor 20 and supplementing the motor output torque applied to the coupling 32 and Load 36. As the scaling function $\gamma$ approaches unity, nearly complete equalization occurs for the coupling resonance such that the composite open loop (I) response of the system extends through and beyond the resonance area 62. Indeed, the closed loop response for the composite servomechanism arrangement including both feedback circuits I and II is shown by a dotted curve 65 in FIG. 2, and extends to a frequency break point 72 depending upon the low pass filter (the value "b" defining the filter pass band) and the open loop gain.

Accordingly, the composite load 36 actuating multifeedback loop system of the present invention results in a broad band load actuator, thus yielding a system with improved frequency response and load control. To illustrate, a heavy weapons gun mount having a mechanical coupling resonance at about 8 Hz is limited in a prior art loop I only system to a 5 Hz or below operative servo band. Correspondingly, with the loop I—loop II system of the present invention, a system with a low pass filter at 10 Hz may be implemented.

The above arrangement is merely illustrative of the principles of the present invention. Numerous modifications and adaptations thereof will be readily apparent to those skilled in the art without departing from the spirit and scope of the present invention. Thus, for example, the present invention may be employed in conjunction with hydraulic pneumatic and other actuators; for linear as well as rotational motion; and the like. For all such arrangements, a supplementary positive feedback loop is employed, utilizing a measure of applied actuator drive as an input.

What is claimed is:

1. In combination in servomechanism apparatus for driving a load via coupling means characterized by a mechanical resonance at rates exceeding said resonance, summing means having first and second additive input ports, a subtractive input port and an output, a motor, a load, coupling means characterized by a mechanical resonance connecting said motor and said load, first network means connecting said output of said summing means and said motor, first negative feedback means having an output connected to said subtractive input port of said summing means and an input responsive to said motor, monitoring means for monitoring the current consumed by said motor, and positive feedback network means having an input connected to said current monitoring means and an output connected to said first additive input port of said summing means for increasing the energization applied to said motor when said monitoring means senses an increasing current consumed by said motor to thereby overcome said mechanical resonance of said coupling means.

2. A combination as in claim 1 further comprising a motor command signal source connected to said second input of said summing means.

3. A combination as in claim 1 wherein said positive feedback and first network means have a transfer function ratio $\gamma$, where $\gamma$ is a positive number not exceeding one.

4. A combination as in claim 1 wherein said first negative feedback means comprises a tachometer.

5. A combination as in claim 1 wherein said monitoring means comprises a resistance serially connected to said motor, and amplifier means connected to said resistance.

6. A method for driving a mechanical load employing a motor and a load-motor coupling exhibiting mechanical resonance at driving rates beyond the coupling mechanical resonant frequency utilizing servomechanism circuitry, comprising the steps of measuring motor speed and producing a first signal proportional to motor speed, measuring motor current and producing a second signal proportional to motor current, producing a command signal, generating a servomechanism error signal by decreasing said command signal with said first motor speed proportional signal in a decrementing, negative feedback sense and said second motor current proportional signal in an additive, positive feedback sense, and driving said motor with said error signal, whereby said load driving bandwidth exceeds said mechanical resonance frequency.

* * * * *